US007530015B2

United States Patent
Sampathkumar et al.

(10) Patent No.: US 7,530,015 B2
(45) Date of Patent: May 5, 2009

(54) XSD INFERENCE

(75) Inventors: Nithyalakshmi Sampathkumar, Redmond, WA (US); Daniel Mikusik, Praha (CZ); Nanshan Zeng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 10/606,340

(22) Filed: Jun. 25, 2003

(65) Prior Publication Data

US 2004/0268234 A1 Dec. 30, 2004

(51) Int. Cl.
*G06F 17/30* (2006.01)

(52) U.S. Cl. ............... 715/237; 715/234; 715/239; 717/142; 717/143

(58) Field of Classification Search ............ 715/513, 715/515, 234, 237, 239; 707/101; 717/142, 717/143
See application file for complete search history.

(56) References Cited

U.S. PATENT DOCUMENTS

| 6,502,112 | B1 * | 12/2002 | Baisley .................. 715/210 |
| 6,654,734 | B1 * | 11/2003 | Mani et al. .................. 707/2 |
| 6,856,992 | B2 * | 2/2005 | Britton et al. .............. 707/100 |
| 7,080,084 | B2 * | 7/2006 | Yoshimura et al. ......... 707/100 |
| 7,134,072 | B1 * | 11/2006 | Lovett et al. ................ 715/234 |
| 2004/0083218 | A1 * | 4/2004 | Feng ......................... 707/100 |

OTHER PUBLICATIONS

Evangelos Kotsakis, XSD: A Hierarchical Access Method for Indexing XML Schemata, Springer-Verlag Londond Ltd. 2002, pp. 4: 168-201.*

Fallside, David; XML Schema Part 0: Primer; May 2, 2001; W3C.*

Tolani, P.M, 'XGrind: A query-friendly XML Processor', Data Engineering, 2002, 18th International Conference.*

Minos Garofalakis, 'XTRACT: A Sytem for Extracting Document Type Descriptors from XML Documents', ACM 200, MOD 2000.*

Bison, S., "Working with XML Schemas", *Application Development Advisor*, Oct. 2001, 5(8), 27-28.

Hongwei, S. et al., "Mapping XML-Schema to Relational Schema", *EurAsia-ICT: Information and Communication Technology. First EurAsian Conference. Proceedings (Lecture Notes in Computer Science* vol. 2510), 2002, 322-329.

Kennedy, D., "The XML Roadmap", *Conference Proceedings. XML, Vision for a New Millennium*, 2000, 4-5.

Kotsakis, E., "XSD: A Hierarchical Access Method for Indexing XML Schemata", *Knowledge and Information Systems*, Apr. 2002, 4(2), 168-201.

* cited by examiner

*Primary Examiner*—Stephen Hong
*Assistant Examiner*—Matthew J Ludwig
(74) *Attorney, Agent, or Firm*—Woodcock Washburn LLP

(57) ABSTRACT

The automatic generation of schemas for XML documents is provided. In an illustrative implementation, a computer readable medium having computer readable instructions to instruct a computing environment to execute one or more inference algorithms is provided. In operation, an XML document is processed according to the computer readable instructions such that the content and tags of the XML document are identified. The XML document is processed according to an inference algorithm, which executes one or more processing rule, and uses the XML document information in conjunction with the rules and operations of the XML schema definition language, to automatically produce a schema for the XML document.

19 Claims, 5 Drawing Sheets

XSD INFERENCE

FIELD OF THE INVENTION

The invention relates to the XML Schema Definitions (XSD), and more particularly, to the generation of XSD for XML documents using inferences from the XML document.

BACKGROUND OF THE INVENTION

In the digital realm, content includes any type of digital information that is used to populate a document, a document page, a web page, etc. The digital data can be text, images, graphics, video, sound etc. The Internet is redefining the way organizations create and publish corporate information and documents. Intra-, inter- and extra-nets are replacing the document approach to the storage of information with online, up-to-date web based information. The result of this shift is that companies are more interested in managing information at the more granular content level rather than the less granular document level.

XML is rapidly becoming the vehicle of choice as a definition language for the description of content-related structures. XML provides great flexibility and universality because XML provides a grammar that can express nearly any content. On the Internet in particular, the standardized representation of content structures fosters the development of previously unrecognized applications.

The extensible markup language (XML) has been designed for system integration. XML is a meta-markup language that provides a format for describing structured data. An XML element can declare its associated data to be any desired data element. XML provides a structural representation of data that has proved broadly implementable and easy to deploy. A piece of information marked by the presence of tags is called an element. Elements can be further described by attaching name value pairs called attributes. Once the data is received by the client, the data can be manipulated edited and presented in multiple ways without being sent back to the server. The XML syntax uses matching start and end tags to mark up information. Presently, XML has been applied to the representations of applications data XML Schema definition language (XSD) is the current standard schema language for all XML documents and data. Currently, developers are required to manually create XML schemas for created XML documents using the XSD language. As more content migrates to XML such task becomes arduous and time intensive. Generally, an XML document is created. To schematize the document, XSD is employed. The benefits of having a schematized document are numerous but include the easier cooperation with cooperating data stores and more efficient query processing on the underlying XML document. Strides have been made to try to automate this process but have yielded ineffective and non-elegant solutions, generally requiring extensive processing which depletes system resources.

From the foregoing, it is appreciated that there exists a need to overcome the shortcomings of the prior art such that the vexing issue of automated schema generation using XSD is resolved.

SUMMARY OF THE INVENTION

The automatic generation of schemas for XML documents is provided. In an illustrative implementation, a computer readable medium having computer readable instructions to instruct a computing environment to execute one or more inference algorithms is provided. In operation, an XML document is processed according to the computer readable instructions such that the content and tags of the XML document are identified. The XML document is processed according to an exemplary inference algorithm, which executes one or more processing rule, and uses the XML document information in conjunction with the rules and operations of the XML schema definition language, to produce a schema for the XML document.

In the contemplated implementation, once a schema is generated, it may be subsequently processed by the inference algorithm to refine the schema. Such process may be repeated until the desired schema is achieved or until no additional refinements result.

Other aspects of the invention are described below.

BRIEF DESCRIPTION OF THE DRAWINGS

The system and methods for providing XSD inference accordance with the herein described systems and methods are further described with reference to the accompanying drawings in which.

DETAILED DESCRIPTION OF ILLUSTRATIVE IMPLEMENTATIONS

Figure 1:
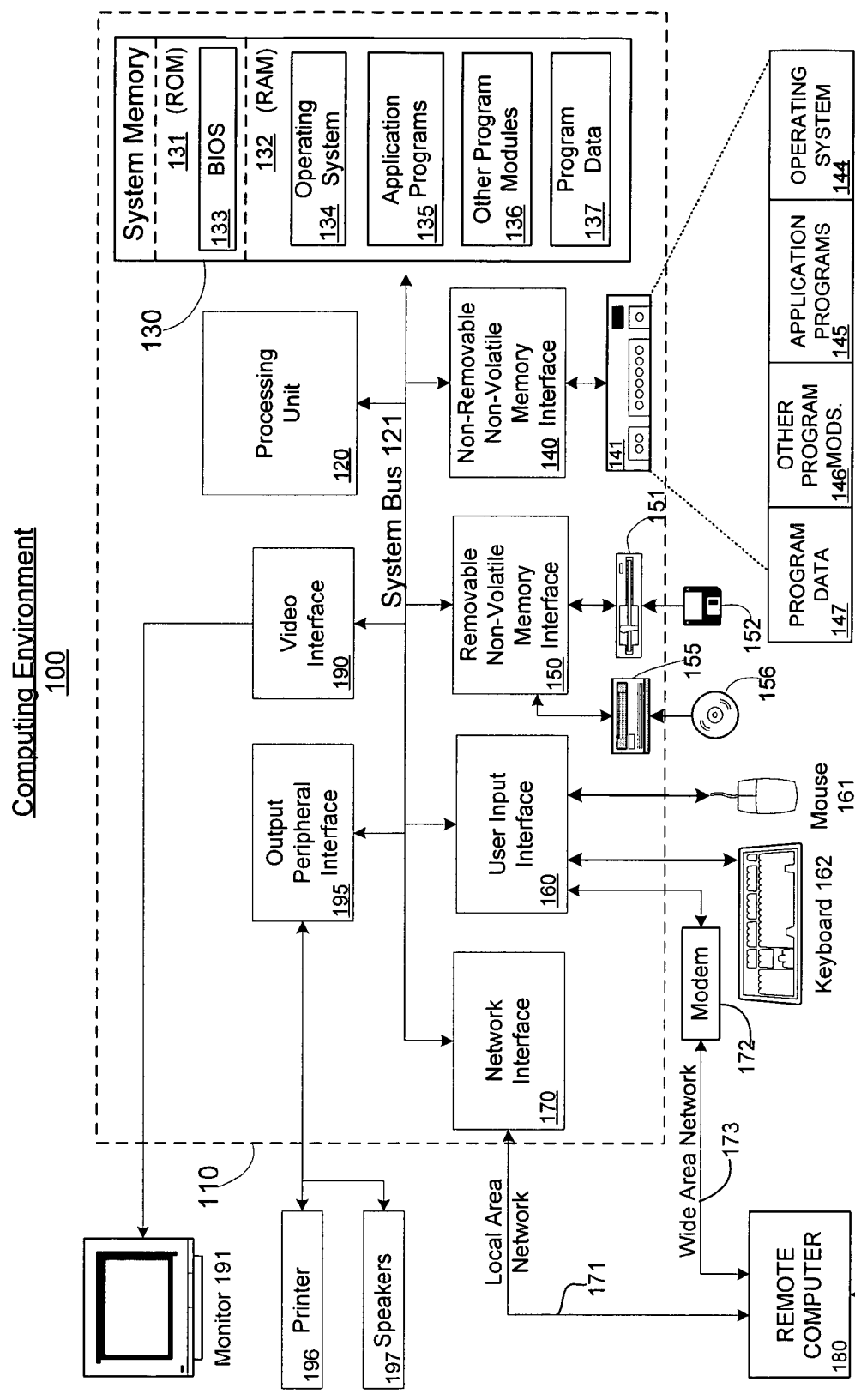
FIGS. 1 and 2 are schematic illustrations of exemplary computing environments suitable for the present invention, with FIG. 2 depicting an exemplary networked computing environment.

Overview:

Much like Data Type Definitions (DTDs), Schemas define the elements that can appear in an XML document and the attributes that can be associated with those elements. Schemas define the document's structure—which elements are children of others, the order the child elements can appear, and the number of child elements. Schemas specify if an element is empty or if it can include text. They can also specify default values for attributes.

XML Schemas are a powerful way to describe allowable elements, attributes, entities, and relationships in an XML document. A more robust alternative to DTDs, the purpose of an XML schema is to define classes of XML documents that must adhere to a particular set of structural and data constraints—that is, it may be desirable to define separate schemas for chapter-oriented books, for an online purchase order system, or for a personnel database, for example.

The following sample code is taken from the W3C's Schema Part 0: Primer (http://www.w3.org/TR/2001/REC-xmlschema-0-20010502/), and illustrates an XML document, po.xml, for a simple purchase order.

```
<?xml version="1.0"?>
<purchaseOrder orderDate="1999-10-20">
  <shipTo country="US">
    <name>Alice Smith</name>
```

```
            <street>123 Maple Street</street>
            <city>Mill Valley</city>
            <state>CA</state>
            <zip>90952</zip>
        </shipTo>
        <billTo country="US">
            <name>Robert Smith</name>
            <street>8 Oak Avenue</street>
            <city>Old Town</city>
            <state>PA</state>
            <zip>95819</zip>
        </billTo>
        <comment>Hurry, my lawn is going wild!</comment>
        <items>
            <item partNum="872-AA">
                <productName>Lawnmower</productName>
                <quantity>1</quantity>
                <USPrice>148.95</USPrice>
                <comment>Confirm this is electric</comment>
            </item>
            <item partNum="926-AA">
                <productName>Baby Monitor</productName>
                <quantity>1</quantity>
                <USPrice>39.98</USPrice>
                <shipDate>1999-05-21</shipDate>
            </item>
        </items>
    </purchaseOrder>
```

The root element, purchaseOrder, contains the child elements shipTo, billTo, comment, and items. All of these child elements except comment contain other child elements. The leaves of the tree are the child elements like name, street, city, and state, which do not contain any further child elements. Elements that contain other child elements or can accept attributes are referred to as complex types. Elements that contain only PCDATA and no child elements are referred to as simple types.

The complex types and some of the simple types in po.xml are defined in the purchase order schema below. Again, this example schema, po.xsd, is derived from the W3C's Schema Part 0: Primer (http://www.w3.org/TR/2001/REC-xmlschema-0-20010502/).

```
<xsd:schema xmlns:xsd="http://www.w3.org/2001/XMLSchema">
<xsd:element name="purchaseOrder" type="PurchaseOrderType"/>
<xsd:element name="comment" type="xsd:string"/>
<xsd:complexType name="PurchaseOrderType">
    <xsd:sequence>
        <xsd:element name="shipTo" type="USAddress"/>
        <xsd:element name="billTo" type="USAddress"/>
        <xsd:element ref="comment" minOccurs="0"/>
        <xsd:element name="items" type="Items"/>
    </xsd:sequence>
    <xsd:attribute name="orderDate" type="xsd:date"/>
</xsd:complexType>
<xsd:complexType name="USAddress">
    <xsd:sequence>
        <xsd:element name="name" type="xsd:string"/>
        <xsd:element name="street" type="xsd:string"/>
        <xsd:element name="city" type="xsd:string"/>
        <xsd:element name="state" type="xsd:string"/>
        <xsd:element name="zip" type="xsd:decimal"/>
    </xsd:sequence>
    <xsd:attribute name="country" type="xsd:NMTOKEN"
        fixed="US"/>
</xsd:complexType>
<xsd:complexType name="Items">
    <xsd:sequence>
        <xsd:element name="item" minOccurs="1"
            maxOccurs="unbounded">
            <xsd:complexType>
                <xsd:sequence>
                    <xsd:element name="productName"
                        type="xsd:string"/>
                    <xsd:element name="quantity">
                        <xsd:simpleType>
                            <xsd:restriction base="xsd:positiveInteger">
                                <xsd:maxExclusive value="100"/>
                            </xsd:restriction>
                        </xsd:simpleType>
                    </xsd:element>
                    <xsd:element name="USPrice" type="xsd:decimal"/>
                    <xsd:element ref="comment" minOccurs="0"/>
                    <xsd:element name="shipDate" type="xsd:date"
                        minOccurs="0"/>
                </xsd:sequence>
                <xsd:attribute name="partNum" type="SKU"
                    use="required"/>
            </xsd:complexType>
        </xsd:element>
    </xsd:sequence>
</xsd:complexType>
<!-- Stock Keeping Unit, a code for identifying products -->
<xsd:simpleType name="SKU">
    <xsd:restriction base="xsd:string">
        <xsd:pattern value="\d{3}-[A-Z]{2}"/>
    </xsd:restriction>
</xsd:simpleType>
</xsd:schema>
```

In this example, the schema comprises, similar to a DTD, a main or root schema element and several child elements, element, complexType, and simpleType. Unlike a DTD, this schema also specifies as attributes data types like decimal, date, fixed, and string. The schema also specifies constraints like pattern value, minOccurs, and positiveInteger, among others. In DTDs, you can only specify data types for textual data (PCDATA and CDATA); XML schema supports more complex textual and numeric data types and constraints, all of which have direct analogs in the Java language.

Note that every element in this schema has the prefix xsd:, which is associated with the W3C XML Schema namespace. To this end, the namespace declaration, xmlns:xsd="http://www.w3.org/2001/XMLSchema", is declared as an attribute to the schema element.

Namespace support is another important feature of XML schemas because it provides a means to differentiate between elements written against different schemas or used for varying purposes, but which may happen to have the same name as other elements in a document. For example, assume two declared namespaces in a schema, one for foo and another for bar. Two XML documents are combined, one from a billing database and another from a shipping database, each of which was written against a different schema. By specifying namespaces in your schema, a differentiation can be made between, say, foo:address and bar: address.

Current practices require the manual generation of the XML Schema which can be an arduous and time intensive process. The herein described systems and methods aim to ameliorate the shortcomings of existing practices by providing automated generation of XML Schemas using XSD language rules and operations. In operation, the XML Schema is inferred according to one or more inference algorithms using the XML defined attributes and elements found in an XML document. By way of example, the herein described systems and methods may be applied to an underlying XML document to create the illustrative code described above. In this context, the XML document acts as input to the XSD inference algorithm wherein a first XML Schema is inferred. The first XML Schema may be further refined by being re-processed by the XSD inference algorithm in conjunction with a second XML document. The second XML document serves as a reference point for the XSD inference algorithm to ensure that proper inferences are being made.

It is appreciated that although the herein described systems and methods are described in the context of the generation of one or more XSD inferences, that the XSD generation techniques may be utilized in various ways that go beyond the scope of the provided examples.

A. Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

B. Exemplary Networked Computing Environment

Figure 2:
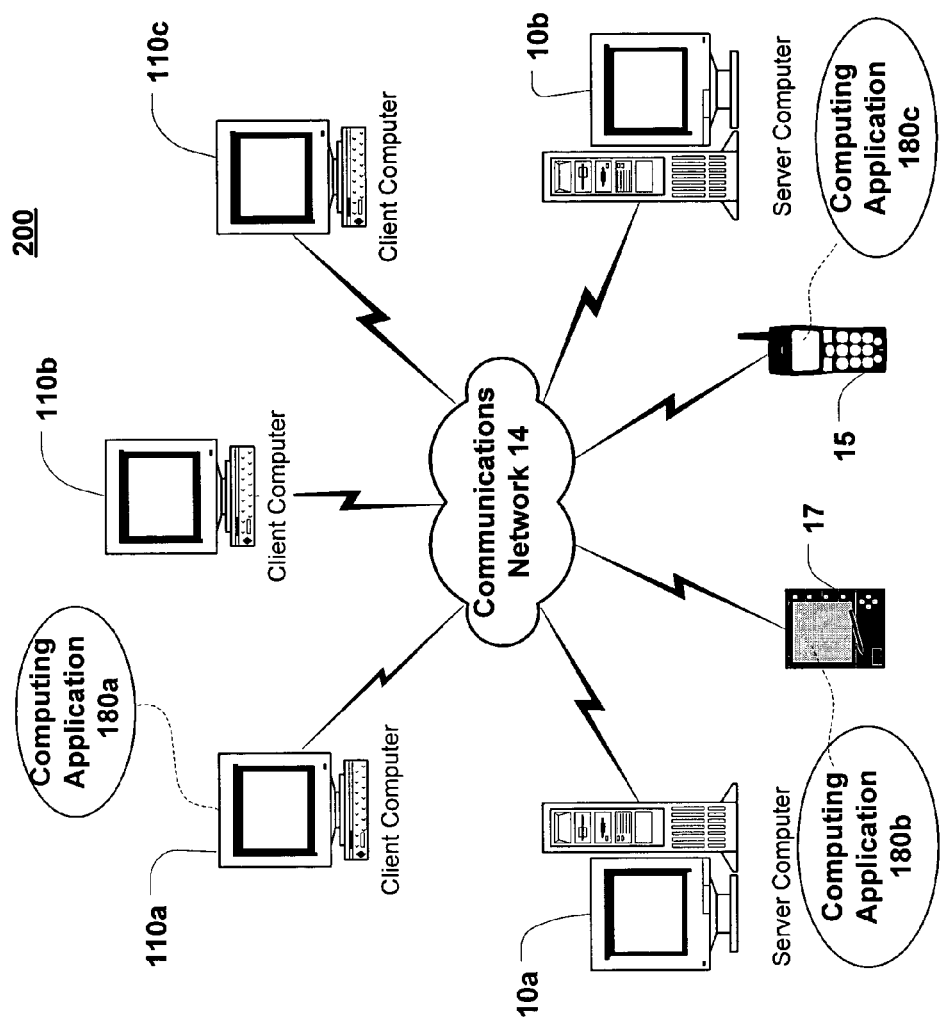

Computer environment 100, described above, can be deployed as part of a computer network. In general, the above description for computers applies to both server computers and client computers deployed in a network environment. FIG. 2 illustrates an exemplary network environment, with a server in communication with client computers via a network, in which the present invention may be employed. As shown in FIG. 2, a number of servers 10a, 10b, etc., are interconnected via a communications network 14 (which may be a LAN, WAN, intranet, the Internet, or other computer network) with a number of client computers 20a, 20b, 20c, or computing devices, such as, mobile phone 15, land-line telephone 16, and personal digital assistant 17. In a network environment in which the communications network 160 is the Internet, for example, the servers 10 can be Web servers with which the clients 20 communicate via any of a number of known protocols, such as, hypertext transfer protocol (HTTP) or wireless application protocol (WAP). Each client computer 20 can be equipped with browser 180a to gain access to the servers 10. Similarly, personal digital assistant 17 can be equipped with browser 180b and mobile phone 15 can be equipped with browser 180c to display and receive various data.

In operation, a user (not shown) may interact with a computing application running on a client computing devices performing XSD Inference. The XSD files may be stored on server computers and communicated to cooperating users through client computing devices over communications network 14. A user may generate, manage, and interact with such XML Schema definitions by interfacing with computing applications on client computing devices. These transactions may be communicated by client computing devices to server computers for processing and storage. Server computers may host computing applications to infer XSD files for XML documents.

Thus, the present invention can be utilized in a computer network environment having client computing devices for accessing and interacting with the network and a server computer for interacting with client computers. However, the systems and methods described herein can be implemented with a variety of network-based architectures, and thus should not be limited to the example shown. The herein described systems and methods will now be described in more detail with reference to a presently illustrative implementation.

C. XSD Inference

The basic concepts for inferring schemas from XML instance documents is that the algorithm used in generating the output schema takes the forward-only, read-only XmlReader class as input. The algorithm uses an InferSchema (XmlReader) method to read the XmlReader class, infer a schema, and create a SchemaCollection that is returned. A second overloaded method, the InferSchema(XmlReader, XmlSchemaCollection) method, takes an XmlReader and an XmlSchemaCollection. The second InferSchema method searches the SchemaCollection for a schema with the same target namespace as the one passed in through the XmlReader. If the schema exists, then the existing schema is refined. If no such schema exists in the collection, a new schema is inferred and added to the collection. If the SchemaCollection argument is null, then the method behaves like the InferSchema method that takes only an XmlReader.

The InferSchema(XmlReader) is commonly used as a first pass on the XML instance document to create its schema, and have that schema added to the SchemaCollection. If the XML instance document used in creating the schema has additional forms or structures not included when the schema was created, an additional XML instance document can be read, and refined with the overloaded InferSchema(XmlReader, XmlSchemaCollection) method, using the SchemaCollection created on the first pass. This will modify the schema created in the first pass.

The changes viewed in the revised schema are based on the new data found in the additional XML instance document. For example, as the XML instance document is traversed, there are assumptions made about the data types found, and the schema is created based on these assumptions. However, if data is encountered on the second pass on the existing XmlSchemaCollection, and that data does not fit the original assumption, the schema restriction is changed.

The following XML is used to show the evolution that a schema undergoes when it is refined.

```
Input
<parent attr1="6">
    <child>Andy</child>
    <child>Todd</child>
</parent>
<parent attr1="Maverick" />
```

When the first attribute, attr1, is encountered, the value of 6 is assumed to be an unsignedByte type. However, when the second parent element is read and the attribute of Maverick is found, it does not fit into the unsignedByte type that was assumed. So, the schema is then modified and the type is changed to string. In addition, the minOccurs for the <child> element is set to "0" since the second <parent> has no child nodes.

The following code snippet assumes that the preceding XML instance document input has been saved as SchemaInput.xml. As is seen in the code, the InferSchema(XmlReader) method is called again to create the original schema.

```
Imports System
Imports System.IO
Imports System.Xml
Imports System.Xml.Schema
Imports .XsdInference
Public Class InferAgain
    Shared Sub Main( )
        'Create XmlReader to pass as argument. Notice that this example
        'uses XmlTextReader, but XmlValidatingReader also works.
        Dim xtr As New XmlTextReader("SchemaInput.xml")
        ' Create the XmlSchemaCollection that the inferred schema is
        ' added to.
        Dim xsc As New XmlSchemaCollection
        ' Create Infer object.
        Dim testInfer As New Infer
        ' Infer schema
        xsc = testInfer.InferSchema(xtr)
        Dim xs As XmlSchema
        For Each xs In xsc
            Dim writer = New StringWriter
            xs.Write(writer)
            Console.WriteLine(writer.ToString( ))
            Dim xsi As XmlSchemaImport
            For Each xsi In xs.Includes
                Dim strWriter = New StringWriter
                xs.Write(strWriter)
                Console.WriteLine(strWriter.ToString( ))
            Next xsi
        Next xs
    End Sub
End Class
[C#]
using System;
using System.IO;
using System.Xml;
using System.Xml.Schema;
using Microsoft.XsdInference;
    namespace InferAgain
    {
    class Class1
    {
    static void Main( )
    {
        // Create XmlReader to pass as argument. Notice that this example
        // uses XmlTextReader, but XmlValidatingReader also works.
        XmlTextReader xtr = new XmlTextReader("SchemaInput.xml");
        // Create the XmlSchemaCollection that the inferred schema is
        // added to.
        XmlSchemaCollection xsc = new XmlSchemaCollection( );
        // Create Infer object.
        Infer testInfer = new Infer( );
        // Infer schema
        xsc = testInfer.InferSchema(xtr);
        foreach (XmlSchema xs in xsc)
        {
            TextWriter writer = new StringWriter( );
            xs.Write(writer);
            Console.WriteLine(writer.ToString( ));
            foreach (XmlSchemaImport xsi in xs.Includes)
            {
                TextWriter strWriter = new StringWriter( );
                xs.Write(strWriter);
                Console.WriteLine(strWriter.ToString( ));
            }
        }
    }
    }
    }
Output
<?xml version="1.0" encoding="utf-16"?>
<xs:schema attributeFormDefault="unqualified"
elementFormDefault="qualified"
xmlns:xs="http://www.w3.org/2001/XMLSchema">
    <xs:element name="parent">
        <xs:complexType>
            <xs:sequence>
                <xs:element maxOccurs="unbounded" name="child" type=
                "xs:string" />
            </xs:sequence>
            <xs:attribute name="attr1" type="xs:unsignedByte" use=
            "required" />
        </xs:complexType>
    </xs:element>
</xs:schema>
```

In the above example, the infer class infers the data type for attributes and elements as simple types. The infer class infers element and attribute values as simple types and includes a type attribute in the resulting schema. All inferred types are simple types. No base types or facets are included as part of the resulting schema.

Values are examined individually as they are encountered in the specified XML. The type is inferred for a value at the time it is examined. If a type has been inferred for an attribute or element, and a value for the attribute or element is encountered, which does not match the currently inferred type, then the infer class promotes the type for each of the rules. The Infer object is stateless between different runs. All needed type information is stored within the schema if it is passed to the Infer object in a XMLSchemaCollection.

Table 1 lists exemplary inferred types for the resulting schema.

TABLE 1

| Simple Type | Description | Comments |
| --- | --- | --- |
| Boolean | true, false, 0, 1 | If only 0 or 1 values are encountered, the type will be inferred as unsignedByte. |
| Byte | Integers in the range of −128 to 127 | None |
| unsignedByte | Integers in the range of 0 to 255 | None |
| Short | Integers in the range of −32768 to 32767 | None |
| unsignedShort | Integers in the range of 0 to 65535 | None |
| int | Integers in the range of −2147483648 to 2147483647 | None |
| unsignedInt | Integers in the range of 0 to 4294967295 | None |

TABLE 1-continued

| Simple Type | Description | Comments |
|---|---|---|
| Long | Integers in the range of −9223372036854775808 to 9223372036854775807 | None |
| unsignedLong | Integers in the range of 0 to 18446744073709551615 | None |
| Integer | A finite number of digits possibly prefixed with "−". | Example: −4654545415498465156544464 |
| Decimal | Numerical values that contain from 0 to 28 digits of precision. | Examples: 4.35, −11.567, 12465.87983, +453.23, 220 |
| Float | Decimals optionally followed by "E" or "e" followed by an integer value representing the exponent. Decimal values can be in the range of −16777216 to 16777216. Exponent values can be in the range of −149 to 104. Float allows for special values to represent infinity and values that are not a number. Special values for float are: 0, −0, INF, −INF, NaN | Examples: −1E4, 1263.45332E12, 12.78e−2, 12, 0, 0.0, −0, INF, −INF, NaN |
| Double | The same as float except that decimal values can be in the range of −9007199254740992 to 9007199254740992 and exponent values can be in the range of −1075 to 970. Double allows for special values to represent infinity and values that are not a number. Special values for float are: 0, −0, INF, −INF, NaN | Examples: −1E4, 1263.45332E212, 12.78e−2, 12, INF |
| Duration | The W3C duration format. | Examples: P1Y2M3DT10H30M, −P120D |
| dateTime | The W3C dateTime format. | Examples: 1999-05-21T13:30:00Z, 2000-01-20T12:00:00-13:00, 2002-02-13T06:30:01 |
| Time | The W3C time format. | Examples: 13:20:00-05:00, 09:25:00Z, 01:20:00 |
| Date | The W3C date format. | Example: 1999-05-21 |
| gYearMonth | The W3C Gregorian month and year format. | Example: 1999-05 |
| String | All other values | None |

In operation, the Infer class examines attribute and element values one at a time. A list of possible types is stored in TypeMask for simple types. The restrictive type from this list is returned at the end of inference algorithm.

For example, given the following XML:

```
<MyElement1 attr1="12" />
<MyElement1 attr1="52344" />
```

When the first attr1 value is encountered, TypeMask is set to {unsignedByte}|byte|unsignedShort|short|unsignedInt|int|integer|decimal|float|double|string} as these are possible typws that can hold a value 12. At this point the type of attr1 is inferred as unsignedByte since it is the most restrictive type from the above list. When the second attribute is encountered, {unsignedByte|byte} are removed from TypeMask as these types cannot store the value 52344. At this point, type unsignedShort is returned since it is the most restrictive type remaining within the TypeMask.

Now, the following XML is provided:

```
<MyElement2 attr2="0" />
<MyElement2 attr2="true" />
```

When the first attr2 value is encountered, the type of attr2 is inferred as unsignedByte based on the value 0. When the second attr2 is encountered, the type is promoted to boolean based on the fact that "true" is not a valid unsignedByte value and Boolean is the most restrictive type left within the TypeMask field.

Figure 3:
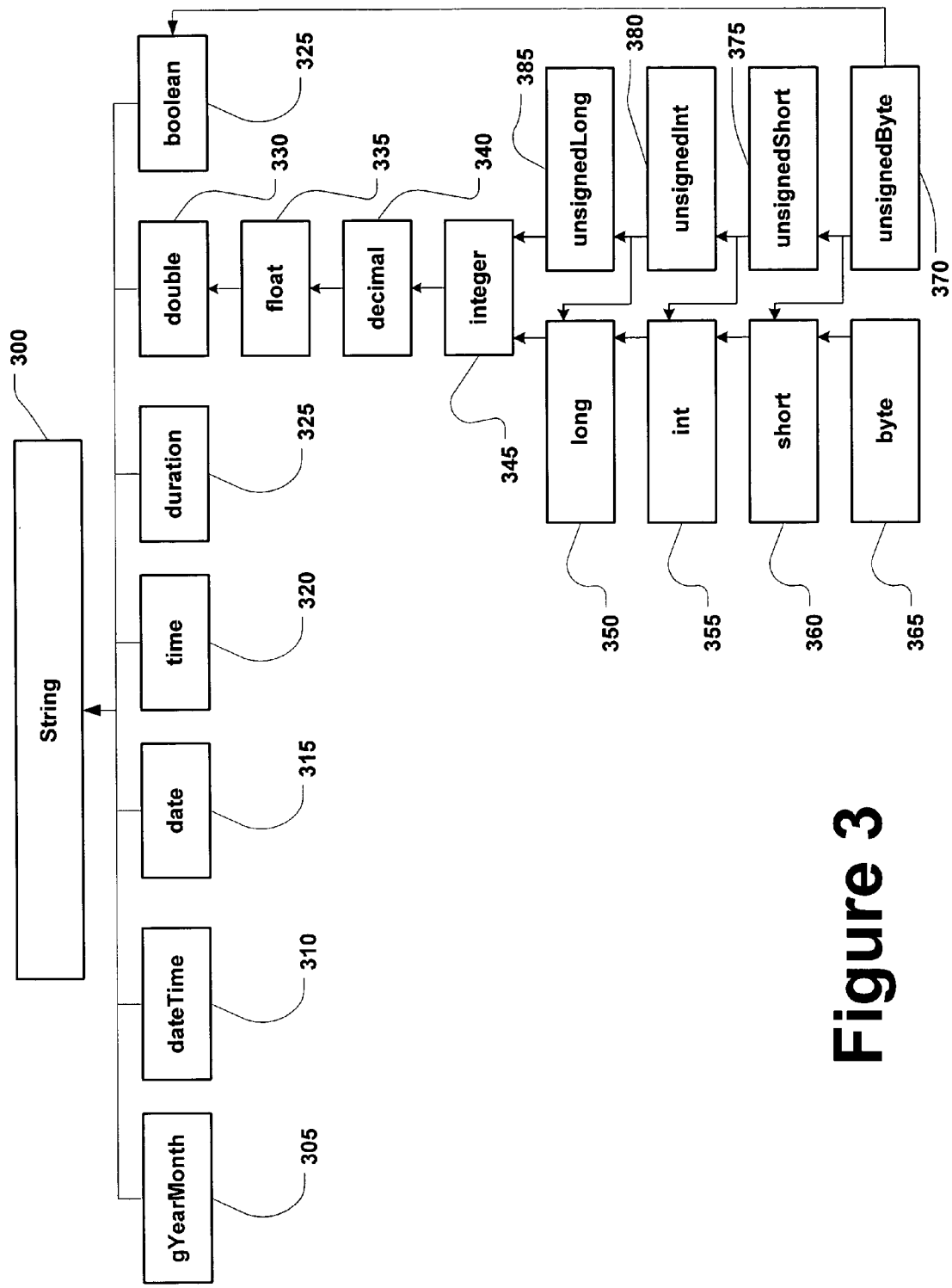
FIG. 3 is a block diagram showing the type definitions within the contemplated XSD inference processing.

FIG. 3 shows in detail the type hierarchy within the XSD language. As is shown, the basic types are byte and unsigned byte 365 and 370, respectively. The unsigned byte type 370 may be promoted to a short type 360, or an unsignedShort type 375, or a boolean type 325. Also byte type 365 may be promoted to short type 360. unsignedShort type 375 may be promoted to unsignedInt type 380 or int type 355. Correspondingly, short type 360 may be promoted to int type 355. Int type 355 may be promoted to long type 350. UnsignedInt type 380 may b promoted to long type 350 or unsignedLong type 385. Both long type 350 and unsignedLong type 385 may be promoted to interger type 340. Integer type 345 may be promoted to decimal type 340. Decimal type 340 may be promoted to float type 335 and float type may be promoted double type 330. As is seen in FIG. 3, double type 330, along with gYearmonth type 305, dateTime type 310, date type 315, time type 320, duration type 325, and boolean type 325 may be promoted to string type 300.

The hierarchy in FIG. 3 is instrumental to the above described processing in that the inference process relies on the types found in the XML document being processed and uses them as a basis to infer the appropriate schema definition from such type. Based on the placement and use of the types, a schema definition may be inferred as described above.

In the above examples, if an element is encountered with xsi:nil specified, only the attributes of the element are processed for inference, and xs:nillable="true" is added to the schema for the corresponding inferred type. If xsi:nil is encountered and there is a value for the element, an exception is thrown. Also, if an element is encountered with xsi:type specified, the xsi:type is ignored. In this case, a comment is added to the schema noting that xsi:type was ignored. If xsi:schemaLocation is encountered, it is ignored. If the following xsi:noNamespaceSchemaLocation is encountered, it is ignored.

Figure 4:
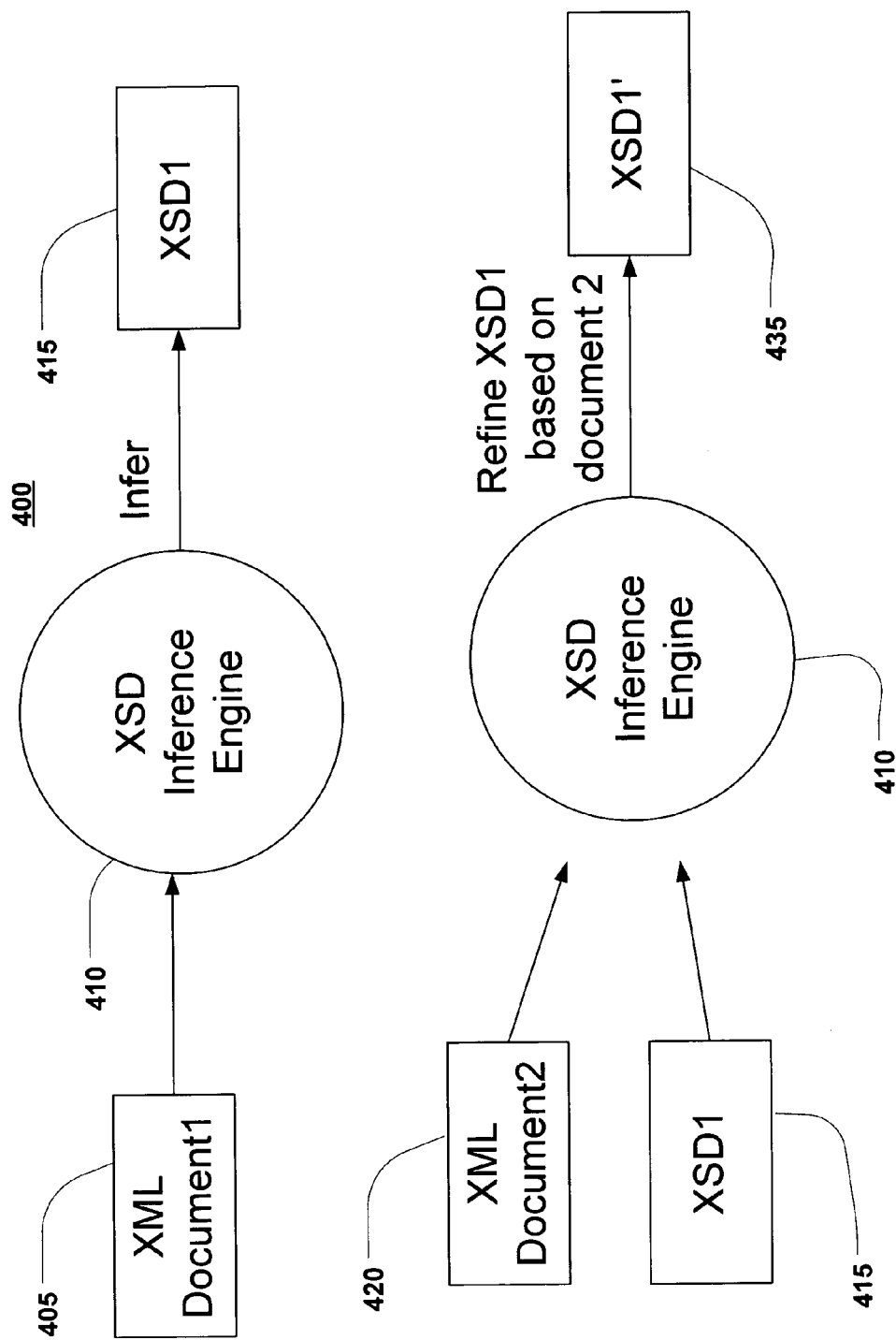
FIG. 4 is a block diagram showing the general data flow and processing performed by the herein described systems and methods.

FIG. 4 shows a block diagram of the general operations of the herein described systems and methods. As is shown, XSD inference system 400 XML Document1 405 acts as input to XSD Inference Engine 410. The XSD Inference Engine 410 processes XML Document1 405 to infer XSD1 415. In a subsequent operation, XSD1 415 and XML Document2 420 act as input to XSD Inference Engine 410. Processing XSD1 415 and XML Document2 420, XSD Inference Engine 410 produces XSD1' 435 which is a refined XSD of XSD1 415. In this context, the XSD Inference Engine 410 validates the inferred XSD1 415 by testing whether the inferred schema, in whole or in part, would apply to the data found in XML document2 420. This operation may be repeated until the desired schema definition is achieved.

Figure 5:
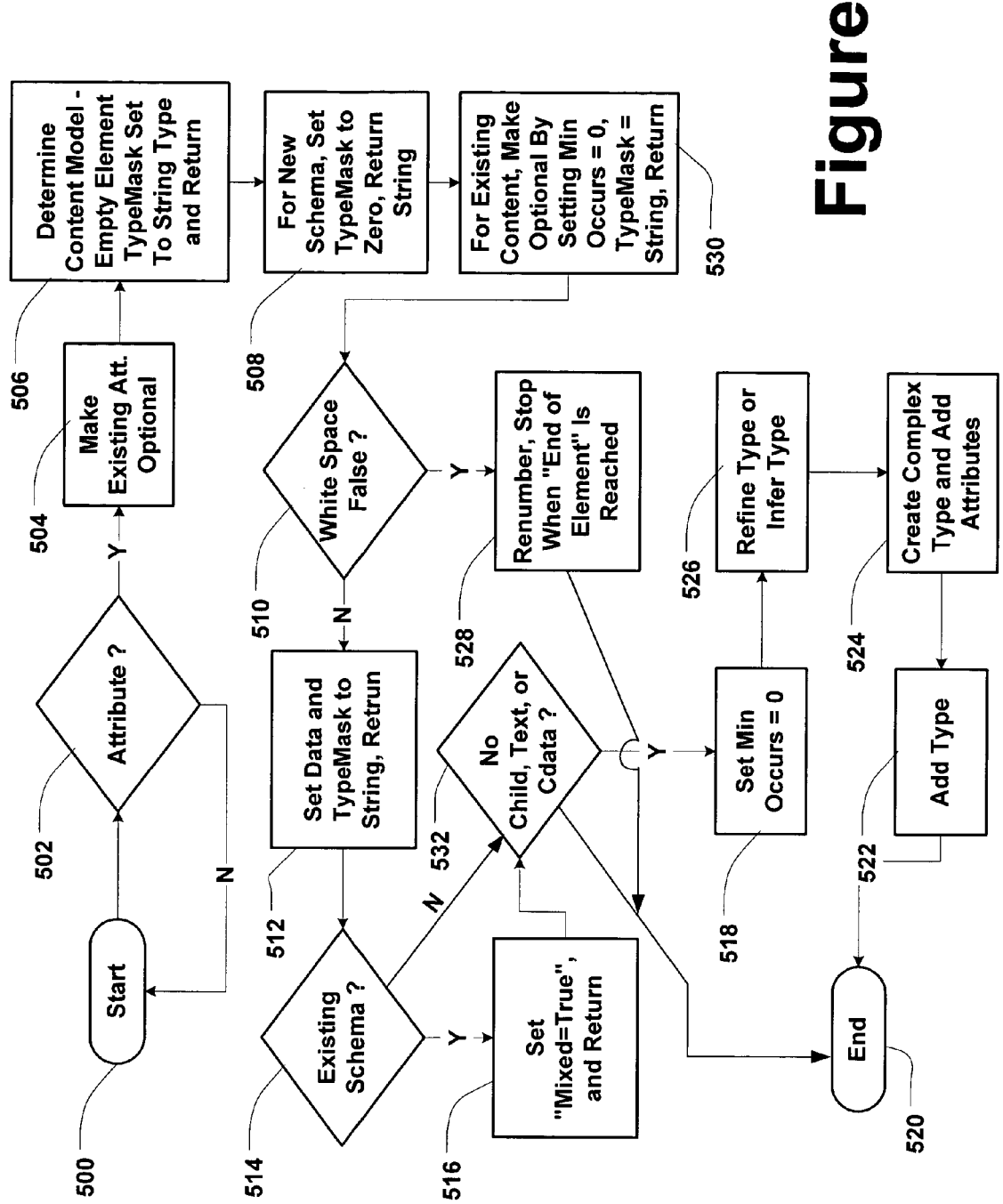
FIG. 5 is a detailed flow chart of the exemplary processing performed when performing XSD inferring in accordance with the herein described systems and methods.

FIG. 5 is a flow diagram of exemplary processing performed when generating an XML Schema definition in accordance with the above description. As is shown, processing begins at block 500 and proceeds to block 502 where a check is performed to determine if the XML document being processed contains an attribute. If there is no attribute processing reverts to block 500. However if there is an attribute processing proceeds to block 504 where the existing attribute is made optional. From there processing proceeds to block 506 where the content model is determined and the empty line numbers are set to strings and the results returned. For new schemas, the line number is set to zero and the string returned at block 508. For existing content, the attribute is made optional by setting the Min Occurs to a value of zero and the line number is set to string at block 530.

A check is then performed at block 510 to determine if there is white space. If there is no white space, processing proceeds to block 528 where the content is renumbered and such process is stopped when the end of element is reached. Processing then terminates at block 520. If however at block 510, it is determined that white space does exist, processing proceeds to block 512 where the data and line number are set to string and the results are returned.

Processing then proceeds to block 514 where a check is performed to determine if there is an existing schema for this document. If there is an existing schema, an internal processing variable mixed is set to true and the results returned. From there a check is performed to determine if there is no child, text, or Cdata. If this is the case, the Min Occurs=0 at block 518. From there, processing proceeds to block 526 where type is refined or inferred. A complex type is created and the attribute added to the schema definition at block 524 and the type added at block 522. Processing then terminates at block 520. However, at block 514 it is determined that there is no schema processing proceeds to block 532 and proceeds there from.

D. CONCLUSION

In sum, the herein described systems and methods provide XML schema definition inferences. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed:

1. A system including a processor to infer XML schema definitions comprising:
   an XSD (XML schema definition) inference engine, the XSD inference engine configured to accept a XML document as input;
   the XSD inference engine further configured to process the XML document to generate an XML schema definition, wherein the XML schema definition includes at least an inferred first elements that appears in the XML document, an inferred first attributes associated with the first element, and an inferred first data type associated with the first attribute;

the XSD inference engine further configured to add the XML schema definition to a collection;

the XSD inference engine further configured to accept a second XML document as input and determine if the second XML document includes an inferred second attribute associated with the inferred first element that is inconsistent with the inference made with respect to first data type, and if so, the XSD inference engine is further configured to modify the schema definition in the collection by inferring a new data type that is consistent with the inferred first and second attributes.

2. The system as recited in claim 1, wherein the XSD inference engine comprises a computing application capable of processing XML documents.

3. The system as recited in claim 2, wherein the XSD inference engine comprises at least one inference algorithm operating within the constraints of the XML schema definition language.

4. The system as recited in claim 1, wherein the second XML document acts as input to the XSD inference engine along with the inferred XML schema definition to create a refined XML schema definition.

5. The system as recited in claim 4, wherein the refined XML schema definition acts as input to the XSD inference engine along with a third XML document to produce a second refined XML schema definition.

6. A method to infer XML schema definitions comprising:
receiving an XML document as input, the XML document having attributes and data type information associated with the attributes;
inferring first attributes and first data type information present in the XML document;
generating a schema definition defining elements that appear in the XML document, inferred first attributes associated with the elements, and inferred first data type information associated with the inferred first attributes from the inferred attributes and first data type information;
adding the schema definition to a collection; and
receiving a second XML document as input, determining if the second XML document has second attributes associated with the elements and second data type information that is inconsistent with the inference made with respect to the first data type information, and if so, modifying the schema definition by inferring new data type information that is consistent with the first and second attributes.

7. The method as recited in claim 6, further comprising making existing attributes optional if it is determined that an attribute does not exist in the XML document.

8. The method as recited in claim 7, further comprising determining the content model.

9. The method as recited in claim 8, further comprising determining if a new schema is to be inferred.

10. The method as recited in claim 9, further comprising setting the attribute to optional for existing content.

11. The method as recited in claim 10, further comprising determining if there is white space in the XML document.

12. The method as recited in claim 11, further comprising setting the date and line number to strings in the event that there exists white space in the XML document.

13. The method as recited in claim 11, further comprising determining if a schema definition already exists for the XML document.

14. The method as recited in claim 13, further comprising refining the type or inferring the type.

15. The method as recited in claim 14, further comprising creating a complex type.

16. The method as recited in claim 15, further comprising adding attributes.

17. The method as recited in 16, further comprising adding a type.

18. A computer storage medium having computer readable instructions to instruct a computer to generate an XML schema comprising:
an inference algorithm, the inference algorithm for processing XML data to identify first data types associated with first attributes and generating an XML schema defining elements that appear in the XML data, the first attributes associated with the elements, and the first data types associated with the first attributes, adding the XML schema to a collection, receiving additional XML data and determining if the additional XML data includes second attributes associated with the elements and second data type information associated with the second attributes that are inconsistent with the first data type information, and if so, modifying the XML schema by inferring new data type information that is consistent with the first and second attributes.

19. The computer storage medium as recited in claim 18, wherein the inference algorithm is part of a computing application for use in XML data processing.

* * * * *